(12) United States Patent  (10) Patent No.: US 9,460,002 B1
Khokhar et al.  (45) Date of Patent: Oct. 4, 2016

(54) MEMORY ALLOCATION

(71) Applicant: EMC Corporation, Hopkinton, MA (US)

(72) Inventors: Muzhar S Khokhar, Shrewsbury, MA (US); Ankita A Pawar, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 40 days.

(21) Appl. No.: 14/320,321

(22) Filed: Jun. 30, 2014

(51) Int. Cl.
  *G06F 12/02* (2006.01)
  *G06F 12/08* (2016.01)
(52) U.S. Cl.
  CPC ......... *G06F 12/023* (2013.01); *G06F 12/0871* (2013.01)

(58) Field of Classification Search
  CPC .................................................. G06F 12/023
  See application file for complete search history.

(56) References Cited

U.S. PATENT DOCUMENTS

2010/0077172 A1* 3/2010 Pizlo .................. G06F 12/0269
                                                     711/170

* cited by examiner

*Primary Examiner* — Duc Doan
(74) *Attorney, Agent, or Firm* — Krishnendu Gupta; Jason A. Reyes

(57) ABSTRACT

There is disclosed a technique for use in memory allocation. In one embodiment, the technique comprises a method. The method comprises the step of determining the size of an item. The method also comprises the step of determining whether to allocate the item to stack or heap memory based on the size of the item.

17 Claims, 5 Drawing Sheets

MEMORY ALLOCATION

TECHNICAL FIELD

The present invention relates generally to memory allocation. More specifically, the invention relates to a method, an apparatus, and a computer program product for optimizing use of stack and heap memory.

BACKGROUND OF THE INVENTION

Stack memory is an area of memory allotted for automatic variables. Automatic variables are allocated and de-allocated automatically when program flow enters and leaves the variable's scope. Stack memory is allocated and de-allocated at the top of the stack, using Last-In-First-Out (LIFO). Because of this process, stack allocation is simpler and typically faster than heap allocation.

Heap memory is set aside for dynamic allocation. Unlike the stack, there's no enforced pattern to the allocation and de-allocation of blocks from the heap; you can allocate a block at any time and free it at any time. This makes it much more complex to keep track of which parts of the heap are allocated or free at any given time.

Furthermore, allocating and de-allocating many small blocks may leave the heap in a state where there are a lot of small free blocks interspersed between the used blocks. Consequently, a request to allocate a large block may fail because none of the free blocks are large enough to satisfy the allocation request even though the combined size of the free blocks may be large enough. This is what is referred to as heap fragmentation.

In languages like C and C++, data stored on the heap can be deleted manually by the programmer using one of the built in keywords like free, delete, or delete[ ]. Other languages like Java and .NET can use garbage collection to automatically delete memory from the heap without the programmer having to do anything. On the other hand, data on the stack can be automatically de-allocated when variables go out of scope.

SUMMARY OF THE INVENTION

There is disclosed a method, comprising: determining the size of an item; and based on the size of the item, determining whether to allocate the item to stack or heap memory.

There is also disclosed an apparatus, comprising: at least one processing device, said at least one processing device comprising a processor coupled to a memory; wherein the apparatus is configured to: determine the size of an item; and based on the size of the item, determine whether to allocate the item to stack or heap memory.

There is further disclosed a computer program product having a non-transitory computer-readable medium storing instructions, the instructions, when carried out by one or more processors, causing the one or more processors to perform a method of: determining the size of an item; and based on the size of the item, determining whether to allocate the item to stack or heap memory.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
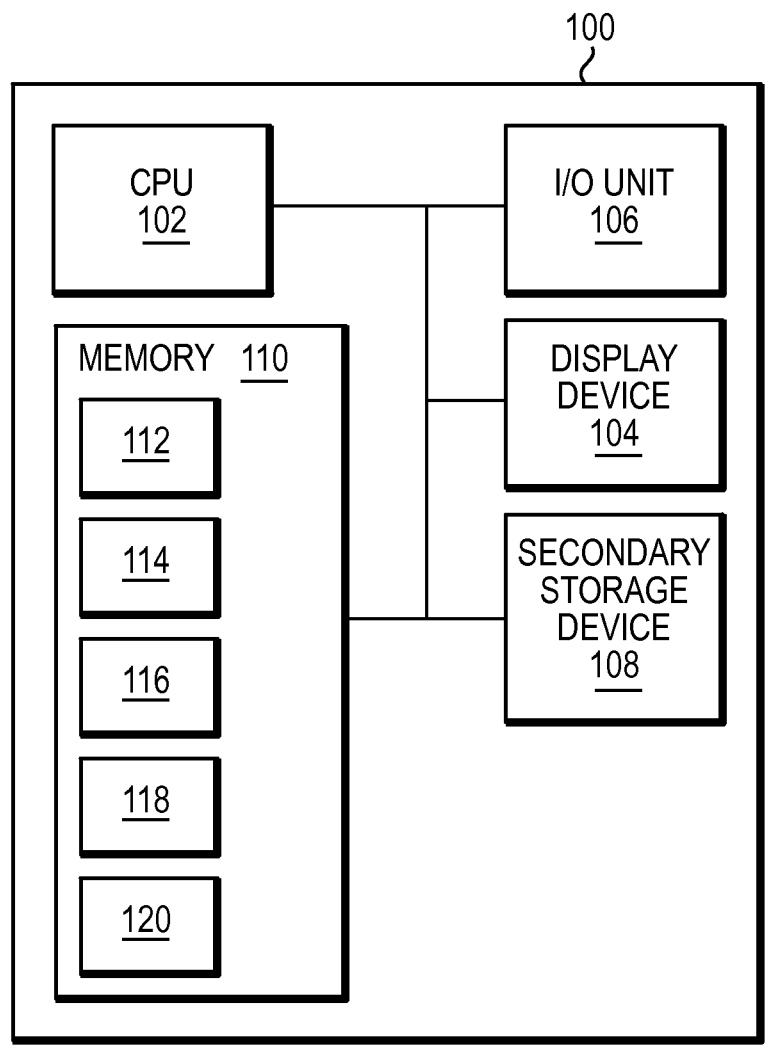
FIG. 1 depicts a block diagram of a data processing system consistent with the present invention.

FIG. 1 depicts a block diagram of a data processing system 100 suitable for optimizing memory allocation consistent with the present invention. As shown, data processing system 100 comprises a central processing unit (CPU) 102, a display device 104, an input/output (I/O) unit 106, a secondary storage device 108, and a memory 110. The data processing system may further comprise standard input devices such as a keyboard, a mouse or a speech-processing means (each not illustrated).

Memory 110 comprises a program 112 that effects optimizing memory allocation during a compile-related processing of a source code 114 or during run time of an object code 116. Program 112 can be implemented as a stand-alone program or module or as part of another program or module, such as a pre-compiler optimizer, a compiler, a post-compiler optimizer, a linker, a loader, or another program or module associated with the compilation process. As will be described in more detail below, the program 112 comprises memory allocation instructions for allocating items to the heap and the stack. The items are, for example, objects, variables, pointers, or other items. As will be described in detail below, the size of an item determines whether it will be placed on the heap or stack. The stack 118 and the heap 120 also are depicted in the memory.

One having skill in the art will appreciate that program 112 can reside in a memory on a system other than data processing system 100. Program 112 may comprise or may be included in one or more code sections containing instructions for performing their respective operations. While program 112 is described as being implemented as software, the present implementation may be implemented as a combination of hardware and software or hardware alone.

Although aspects of methods, systems and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one having skill in the art will appreciate that a data processing system suitable for use with methods, systems, and articles of manufacture consistent with the present invention may contain additional or different components.

Figure 2:
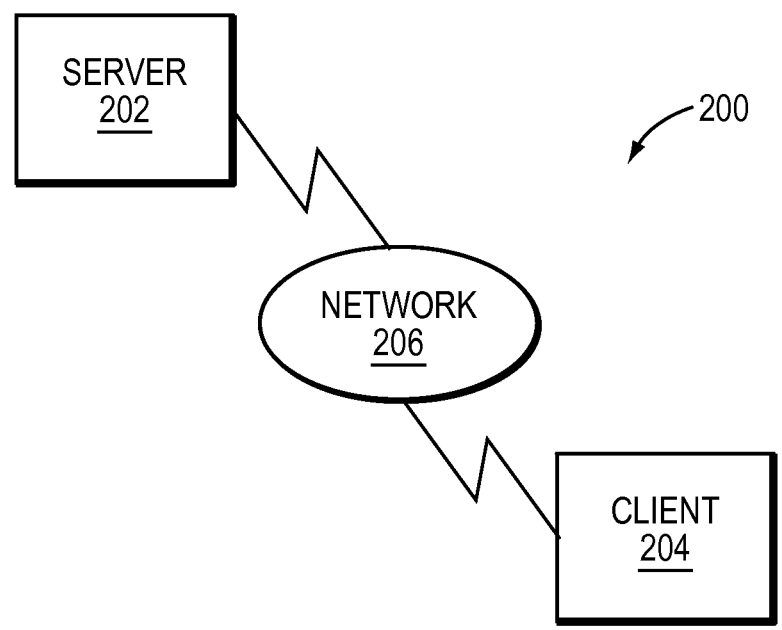
FIG. 2 shows a block chart of a client-server data processing system consistent with the present invention.

Data processing system 100 also may be implemented in a client-server environment, like the one shown in FIG. 2 which depicts a block diagram of a client-server data processing system 200. A server 202 and a client 204 are each connected to a network 206, such as a Local Area Network, Wide Area Network, or the Internet. At least a portion of, for example, the program can be stored on the client, while some or all steps of the processing can be carried out on the server, which is accessed by the client via the network. The client and server each can comprise components similar to those described above with respect to data processing system 100, such as a CPU, an I/O unit, a memory, a secondary storage device, and a display device.

Figure 3:
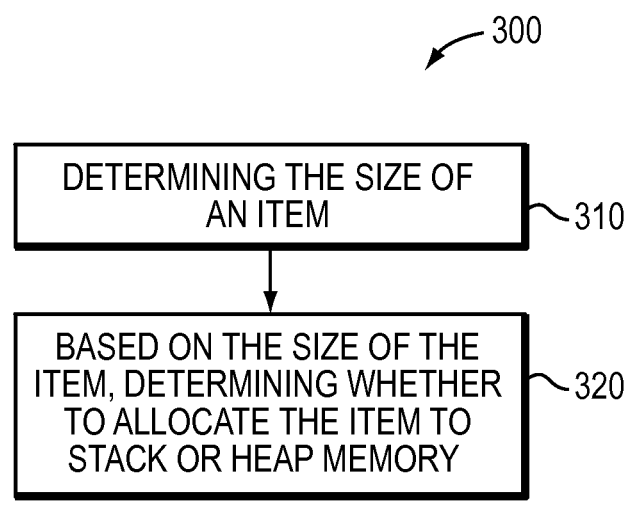
FIG. 3 depicts a flow chart showing a method of carrying out the technique for optimizing memory allocation consistent with the present invention.

FIG. 3 depicts a flow chart showing a method 300 of carrying out the technique for optimizing memory allocation. In the flow diagram, the operations are summarized in individual blocks. The method 300 may, but need not necessarily, be implemented in the environment of FIG. 1.

At step 310, the method comprises determining the size of an item. For example, the item may be an object. At step 320, the method comprises determining whether to allocate the item to stack or heap memory based on the size of the item. It should be understood that determining whether to allocate the item to stack or heap memory comprise comparing the size of the item to a threshold. The item may be allocated to stack memory if the size of the item is less than the threshold. The item may be allocated to heap memory if the size of the item is greater than the threshold. In at least one embodiment, the stack memory may comprise at least two levels for items of different sizes. Accordingly, there may be two thresholds associated with the stack memory. If the size is less than a first threshold associated with the stack then the item is allocated to the stack associated with the first threshold. If the size is greater than the first threshold, but less than a second threshold, the item is allocated to the stack associated with the second threshold. If the size is greater than the second threshold then the item is allocated to the heap. It should also be appreciated that the method comprises logging information relating to the stack or heap memory. For example, the information may comprise at least one of line number where memory was allocated, file where the memory allocation was called for, and the object allocated/de-allocated.

Advantageously, the technique as described herein overloads memory allocation and de-allocation functions like new and delete that allocate and de-allocate objects on program stack in order to improve program performance. When the program starts, a large memory block can be allocated for stack allocations. Objects may be categorized based on size so objects which fall under a specific size (e.g., 1000 bytes) can be allocated on program stack and the rest can be allocated on heap. Essentially, the arrangement is a hybrid type arrangement in that it takes advantage of both stack and heap allocations.

The overloaded functions can also log some important details. These details may include line number where memory was allocated, file where the memory allocation was called for, and the object allocated/de-allocated. Logging details like line number, file name, object and operation can help to identify the object leaking memory, line number where it is leaking and also the file where the allocation/de-allocation is occurring. This kind of information can be used to analyze where and how a memory leak was occurring.

Along with logging, the function overloading is also accompanied by hybrid allocation of objects. It should be appreciated that the idea is to allocate small objects on stack and bigger ones on heap. This approach is beneficial in that the time to allocate and de-allocate objects is reduced since stack allocations are faster than heap. Also, if the object was allocated on stack, and if the user forgets to de-allocate small objects which could be huge in number as compared to bigger ones, then it won't contribute to any kind of memory leak.

Figure 4:
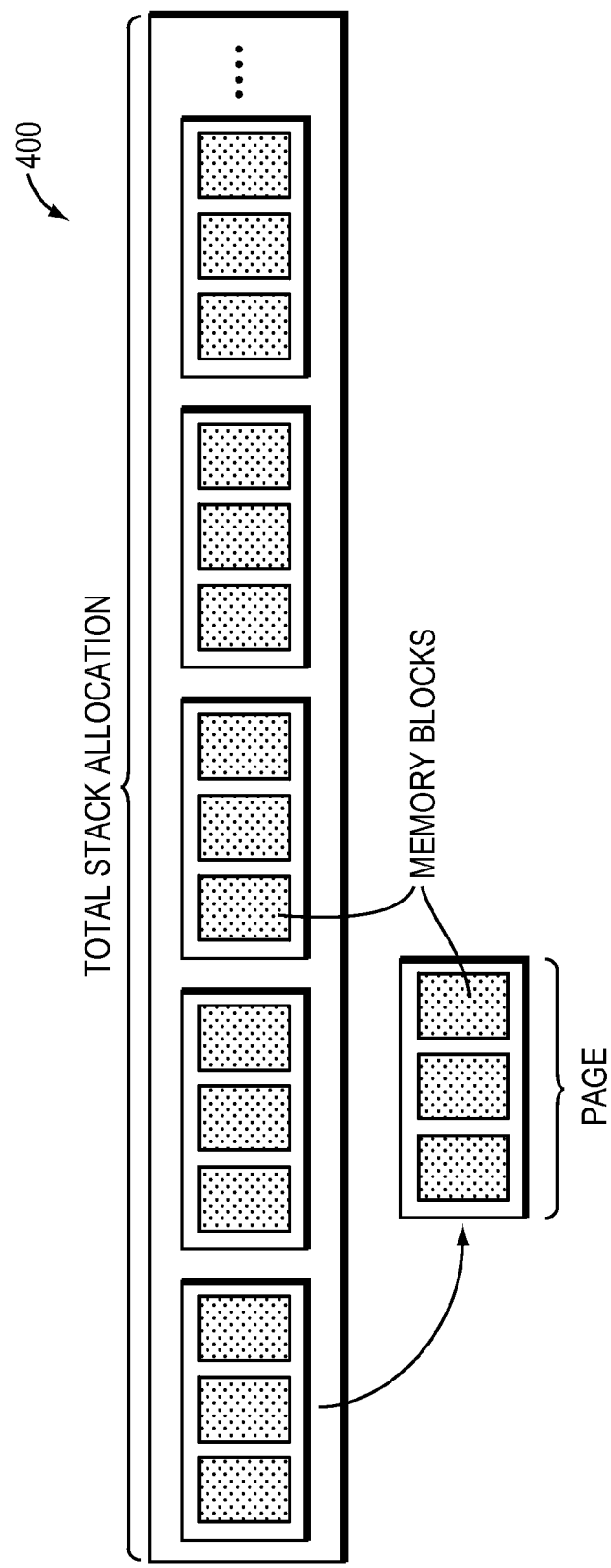
FIGS. 4 and 5 depict diagrams of different embodiments of the technique consistent with the present invention.
Figure 5:
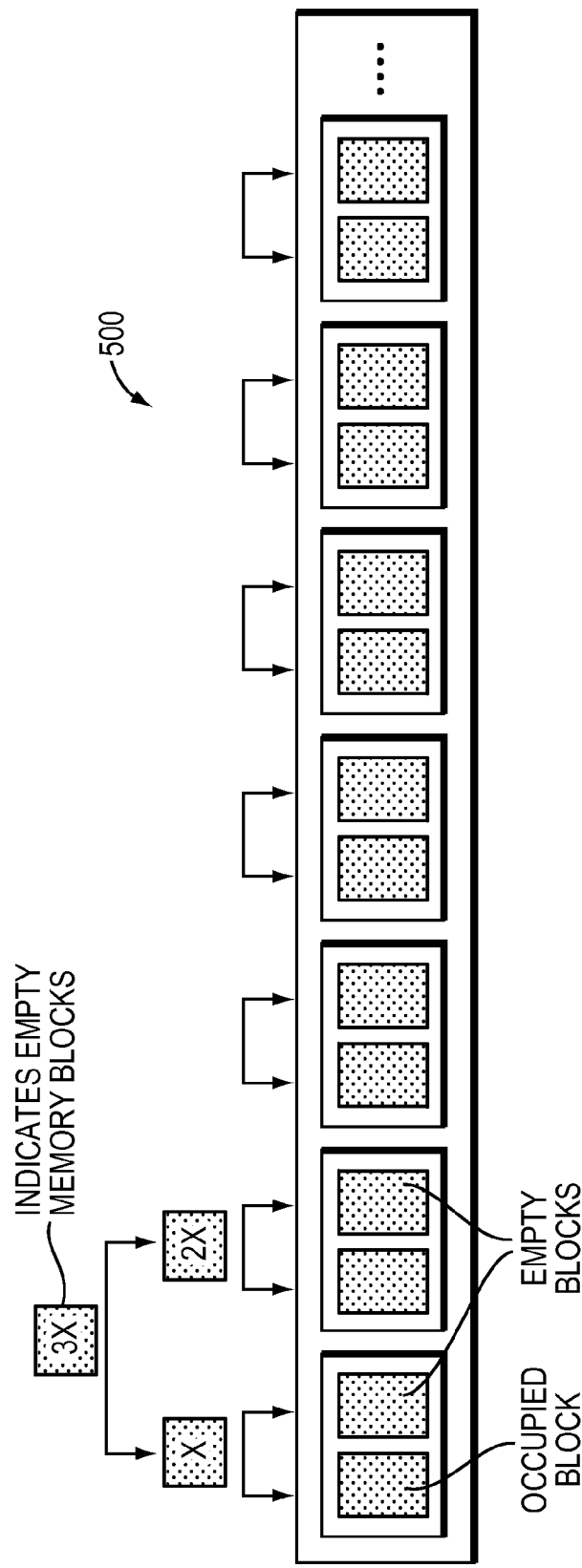

Additionally, fragmentation of the heap memory is reduced since only objects large in size are allocated on heap. The reduction in fragmentation can be achieved by two approaches. The first approach involves basic allocation on stack of small objects called Simple Hybrid 400 (see FIG. 4). The Simple Hybrid approach involves moving linearly across the stack to locate empty memory slots for the object. It should be appreciated that the complexity is dependent on the number of objects allocated. The second approach involves a B+ tree optimized Simple Hybrid algorithm called B+ Tree Hybrid 500 (see FIG. 5) which determines free space in stack block by only traversing to part of stack which had enough free space to allocate the object. In B+ tree, the stack is converted into a tree like structure where the leaf nodes of this tree were stack memory slots and the non-leaf node would denote the amount of free space available in the leaf nodes of that sub-tree. The complexity is this approach is very much dependent on the height of the tree. Both of these approaches can be written in C for windows. These hybrid prototypes can be compared against regular Heap Based allocation using two test cases. It should be appreciated that the regular Heap Based allocation may be the default. The other two approaches may be competing against the default to determine the best approach.

For a test case (i.e., test case 1), a variable was allocated and de-allocated for the number of iterations shown. It can be clearly seen in the below table how Simple Hybrid out performed default Heap-Based allocations and when the number of iterations increased, the gap widened significantly. In case of B+ Tree Hybrid, it was better than Heap Based but not as good as Simple Hybrid because single variable allocation in case of B+ Tree requires tree traversal as compared to Simple Hybrid which just consist of single instruction to point to allocated space.

In another test case (i.e., test case 2), the memory was fragmented to check the performance of the three allocation types. From the results, Simple Hybrid did slightly better than Heap Based allocations even though Heap Based allocations had an advantage of background processes which were carried out to optimize allocations for fragmentation (i.e., Compaction, Mark & Sweep). B+ Tree was optimized to redirect only to free spaces instead of traversing whole stack, hence the performance shift was significant compared to Heap.

| Test No. | Test Cases | Iterations | Heap Based (ms) | Simple Hybrid (ms) | B+ Tree Hybrid (ms) |
|---|---|---|---|---|---|
| 1. | Simple Allocation & De-allocation | 1,000,000 | 202 | 94 | 156 |
|    |                                   | 10,000,000 | 2090 | 998 | 1294 |
| 2. | Fragmentation | Object Count: 160 Iterations: 1000 | 110 | 109 | 78 |

With respect to the table and associated passages describing same, and in order to provide further clarification, it should be appreciated that the variable is the number of bytes allocated dynamically. Also, it should be understood that for the simple allocation the same sized variable is declared and released across many iterations. Further, it should be noted that for the fragmentation the variable declared is of different size in a sequence so as to force fragmentation. Also, a single iteration includes an allocation and a de-allocation. Moreover, the iteration starts during program begin and ends when program terminates. It should also be noted that the start and end time is calculated at the start and end of the iteration by time stamps. Further, all the tests performed were the same for all 3 systems, i.e. Heap, Simple and B+ Tree. The size was one long variable (4 bytes) allocated dynamically. But the variable could be different sizes, it was just chosen to be 4 bytes long. Additionally, with respect to the table showing test number two and 160 objects, the objects were different in size (between 4 to 16 bytes) to introduce fragmentation.

From the test cases for Simple Allocation and De-allocation and Fragmentation, it is clear that Simple Hybrid and B+ Tree implementations are better in performance than Heap Based allocation. Allocation of smaller objects on stack saved considerable amount of time of the two Hybrid solutions in long iterations which result in better performance for applications based on Hybrid allocations. Fragmentation can be improved just by integrating simple algorithms like B+ tree and saving CPU time and resources by elimination/avoidance of background processes like Mark & Sweep, Compaction. Logging of details during object allocation/de-allocation in new & delete can be helpful to debug memory leaks in a program.

While it has been described above that empty memory slots can be searched linearly (Simple Hybrid) or by tree (B+ Tree Hybrid) during the process of allocation, it should be appreciated that other algorithms can be used to do so (e.g., queue data structure approach).

One having skill in the art will appreciate that the processing steps described are merely illustrative. The processing steps may be performed in a different order than as depicted, and additional intervening steps also may be performed. For example, one having skill in the art will appreciate that alternative algorithms can be used to determine whether an item escapes or survives its allocator.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software, but the present implementation may be implemented as a combination of hardware and software or hardware alone. Further, the illustrative processing steps performed by the program can be executed in an different order than described above, and additional processing steps can be incorporated. The invention may be implemented with both object-oriented and non-object-oriented programming systems. The scope of the invention is defined by the claims and their equivalents.

What is claimed is:

1. A method, comprising:
   determining the size of an item;
   based on the size of the item, determining whether to allocate the item to stack or heap memory, wherein determining whether to allocate the item to stack or heap memory comprises comparing the size of the item to a threshold; and
   in response to determining to allocate to stack, determining whether to utilize one of a simple hybrid approach that involves moving linearly across the stack to locate empty memory slots or a B+ tree structure approach that determines free space in stack by only traversing to part of stack with enough free space, wherein the determination of whether to utilize the simple hybrid approach or the B+ tree structure approach depends on a level of fragmentation in connection with the stack.

2. The method as claimed in claim 1, wherein the item is allocated to stack memory if the size of the item is less than the threshold.

3. The method as claimed in claim 1, wherein the item is allocated to heap memory if the size of the item is greater than the threshold.

4. The method as claimed in claim 1, wherein the stack memory comprises at least two levels for items of different sizes.

5. The method as claimed in claim 1, further comprising:
   logging information relating to the allocation of stack or heap memory.

6. The method as claimed in claim 5, wherein the information comprises at least one of line number where memory was allocated, file where the memory allocation was called for, and the object allocated/de-allocated.

7. An apparatus, comprising:
   at least one processing device, said at least one processing device comprising a processor coupled to a memory;
   wherein the apparatus is configured to:
   determine the size of an item;
   based on the size of the item, determine whether to allocate the item to stack or heap memory, wherein determining whether to allocate the item to stack or heap memory comprises comparing the size of the item to a threshold; and
   in response to determining to allocate to stack, determine whether to utilize one of a simple hybrid approach that involves moving linearly across the stack to locate empty memory slots or a B+ tree structure approach that determines free space in stack by only traversing to part of stack with enough free space, wherein the determination of whether to utilize the simple hybrid approach or the B+ tree structure approach depends on a level of fragmentation in connection with the stack.

8. The apparatus as claimed in claim 7, wherein the item is allocated to stack memory if the size of the item is less than the threshold.

9. The apparatus as claimed in claim 7, wherein the item is allocated to heap memory if the size of the item is greater than the threshold.

10. The apparatus as claimed in claim 7, wherein the stack memory comprises at least two levels for items of different sizes.

11. The apparatus as claimed in claim 7, wherein the apparatus is further configured to:

log information relating to the allocation of stack or heap memory.

12. The apparatus as claimed in claim 11, wherein the information comprises at least one of line number where memory was allocated, file where the memory allocation was called for, and the object allocated/de-allocated.

13. A computer program product having a non-transitory computer-readable medium storing instructions, the instructions, when carried out by one or more processors, causing the one or more processors to perform a method of:
   determining the size of an item;
   based on the size of the item, determining whether to allocate the item to stack or heap memory, wherein determining whether to allocate the item to stack or heap memory comprises comparing the size of the item to a threshold; and
   in response to determining to allocate to stack, determining whether to utilize one of a simple hybrid approach that involves moving linearly across the stack to locate empty memory slots or a B+ tree structure approach that determines free space in stack by only traversing to part of stack with enough free space, wherein the determination of whether to utilize the simple hybrid approach or the B+ tree structure approach depends on a level of fragmentation in connection with the stack.

14. The computer program product as claimed in claim 13, wherein the item is allocated to stack memory if the size of the item is less than the threshold.

15. The computer program product as claimed in claim 13, wherein the item is allocated to heap memory if the size of the item is greater than the threshold.

16. The computer program product as claimed in claim 13, wherein the stack memory comprises at least two levels for items of different sizes.

17. The computer program product as claimed in claim 13, wherein the instructions, when carried out by one or more processors, cause the one or more processors to further perform a method of:
   logging information relating to the allocation of stack or heap memory.

* * * * *